Jan. 31, 1967 A. B. SHARP 3,301,006
MOTOR MOUNT
Filed Aug. 18, 1964 2 Sheets-Sheet 1
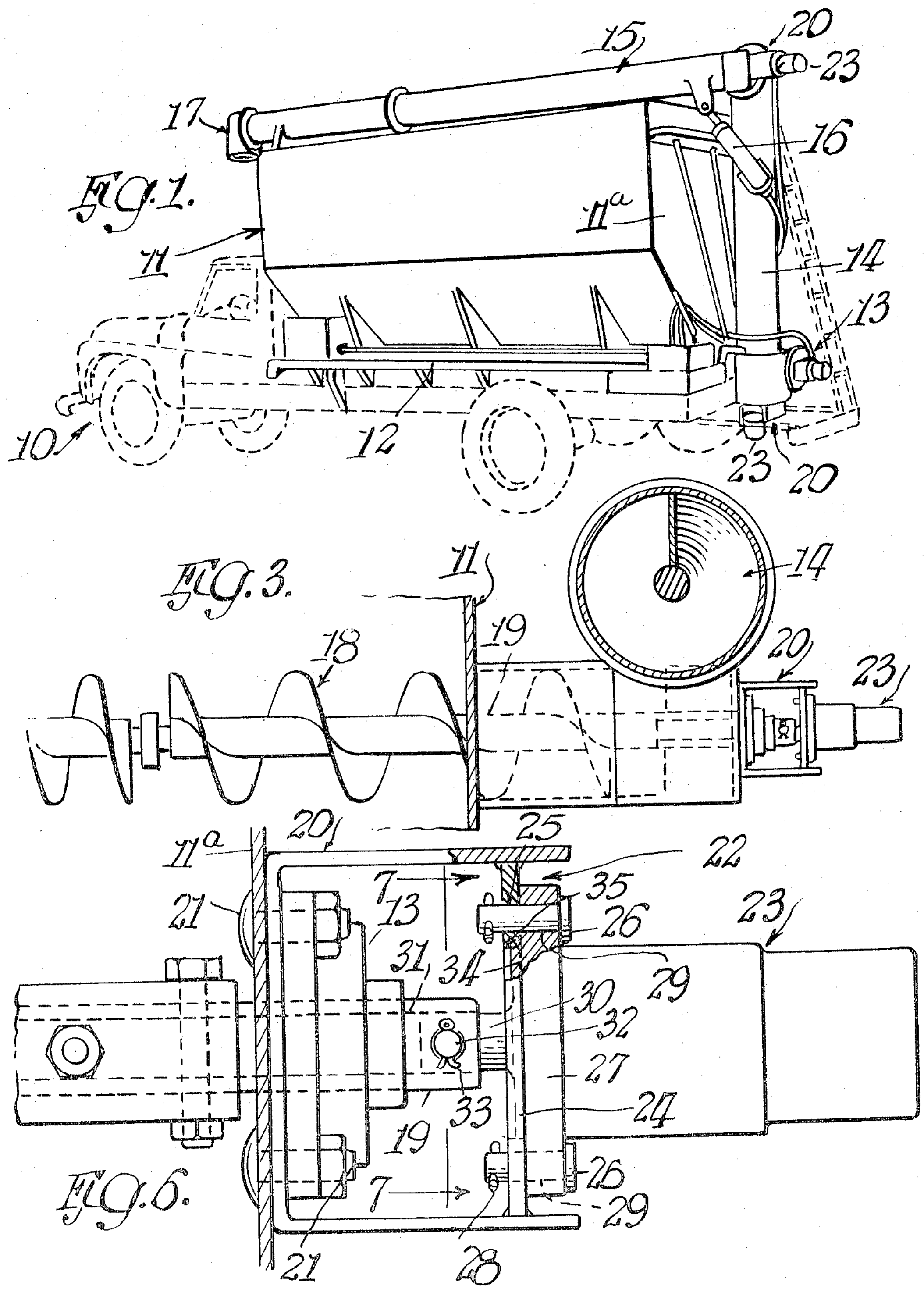

Jan. 31, 1967 A. B. SHARP 3,301,006
MOTOR MOUNT
Filed Aug. 18, 1964 2 Sheets-Sheet 2
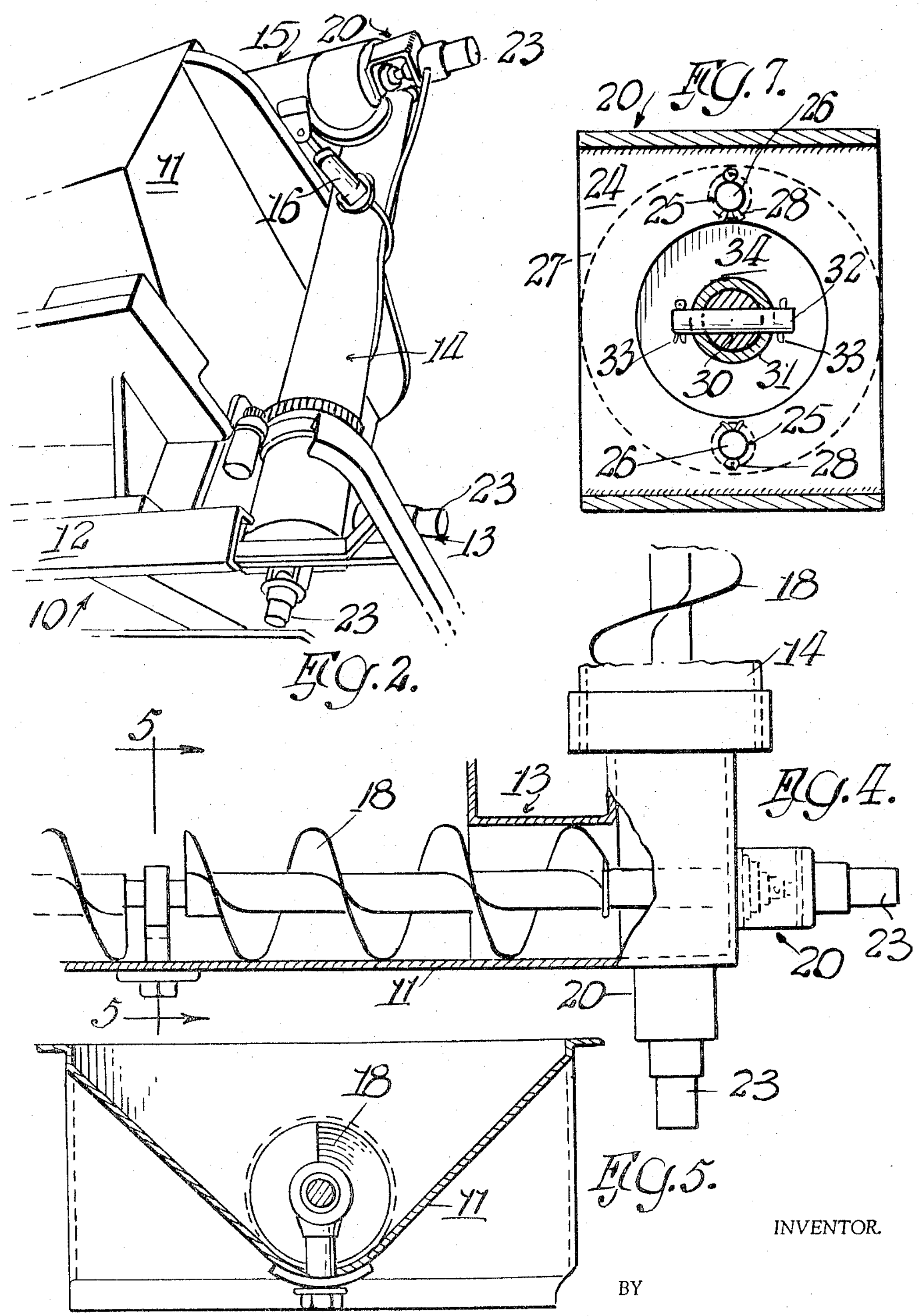
INVENTOR.
BY
Attys

United States Patent Office 3,301,006
Patented Jan. 31, 1967

3,301,006
MOTOR MOUNT

Allen B. Sharp, Ottumwa, Iowa, assignor to Highway Equipment Company, Cedar Rapids, Iowa, a corporation of Iowa Filed Aug. 18, 1964, Ser. No. 390,411
5 Claims. (Cl. 64—4)

This application is a continuation-in-part of my copending application, Serial No. 307,656, filed September 9, 1963, now Patent No. 3,171,558.

This invention relates to a motor mount which is advantageously employed for driving an auger associated with a self-unloading bulk feed body.

In the unloading of bulk material from hopper-like bodies, augers have been widely used in the past and generally have been driven through special drives interconnecting the prime mover with the auger. This has provided a problem, since dust from the unloaded material can interfere with the operation of the drive and cause undue maintenance and, on occasion, premature failure on the part of the unloading mechanism is disadvanageous, especially if it occurs during the midst of the unloading of a sizable quantity of material.

It is, therefore, a general object of this invention to provide a novel drive which, among other applications, is advantageously employed in rotating the auger of a self-unloading feed body.

Another object is to provide a novel motor mount characterized by minimum maintenance and an operation wherein vibration is compensated for in a unique manner Other objects and advantages of the invention may be seen in the details of construction and operation set down in this specification.

The invention is described in conjunction with an illustrative embodiment in the accompanying drawing, in which:

FIG. 1 is a perspective view of a typical mobile bulk feed body equipped with the invention;

FIG. 2 is a fragmentary perspective view of the extreme rear portion of FIG. 1 and showing portions of the apparatus in enlarged scale;

FIG. 3 is a fragmentary top plan view of one of the augers and its drive seen in FIGS. 1 and 2;

FIG. 4 is a side elevational view of the apparatus seen in FIG. 3;

FIG. 5 is a rear end elevational view of the apparatus seen in FIGS. 3 and 4 and in enlarged scale;

FIG. 6 is a fragmentary side elevational view partially broken away and in section therein of the apparatus seen in FIG. 3; and FIG. 7 is a detail vertical sectional view through a part of the apparatus as taken on the line 7—7 of FIG. 6.

The invention is shown in connection with a specific use which, it is believed, will facilitate the understanding thereof. Thus, in FIG. 1, the numeral 10 designates generally a truck equipped with an elongated hopper generally designated 11. The hopper 11 is seen to be equipped with a frame 12 which provides means for interconnecting the hopper 11 with the truck 10. Projecting from the rear of the hopper and immediately adjacent the bottom thereof, is a first auger casing 13, also seen in FIGS. 3–6.

Coupled to the first auger casing 13 for removal of bulk feed material therefrom is a second auger casing 14 which is seen to be vertically disposed at the rear of the truck 10. A third auger casing 15 is seen to be coupled to the top of the second auger casing 14 and, by virtue of the hydraulic ram 16, is adapted to be swung through a substantially vertical arc so as to discharge bulk material from the hopper 11 through the spout 17 at the forward end of the third auger casing 15.

Each of the auger casings 13—15 is equipped with an auger of the character generally designated 18 in FIG. 3, which is seen to include a shaft extension 19. It will be appreciated that feed bodies of this general nature have been used before and that the foregoing description has been given for the sake of illustrating a preferred environment for the inventive auger drive.

Reference to FIG. 6 reveals that a bracket generally designated 20 is rigidly secured by means of bolts 21 to the rear wall 11*a* of the hopper 11. It will be appreciated that in the case of the second and third auger casings 14 and 15 this connection is made to the end wall of the casings as at 22 in confronting relation with a motor generally designated 23. Provided within the open end 22 of the bracket 20 is a plate-like ring 24 which is equipped with openings as at 25 for the receipt of shear pins 26. The motor 23 is equipped with a base flange 27 through which the shear pin 26 extends so as to anchor the motor 23 to the bracket 20. Suitable cotter pins 28 are installed on the shear pins 26 to prevent the shear pins 26 from sliding out of the aligned openings 25 and 29, the openings 29 being provided in the flange 27, as best appears in FIGS. 6 and 7, respectively.

The motor 23 is equipped with an output shaft 30 which is received within an axial bore 31 of the auger shaft extension 19, being secured therein by means of a shear pin 32 equipped with a suitable cotter pin 33. Additionally, the motor 23 is equipped with a pilot boss or projection 34 which is loosely received within the central opening 35 of the ring 24.

In practice, I install the cotter pin 28 in such a position on the shear pin 26 as to provide about 1/16" sliding longitudinal movement in the pin 26. The openings 25 in the plate-like ring 24 provide about a 1/32" clearance or tolerance about the shear pin 26 so that the motor 23 during operation is adapted to move slightly in 3 degrees of movement so as to compensate for deflection in the auger 18.

I also provide about a 1/64" clearance about the shear pin 32 and about a 1/32" clearance between the motor shaft 30 and the axial bore 31 in the extending shaft 19.

The above-mentioned tolerances or clearances provide, in effect, a loose coupling between the motor 23 and the bracket so that the motor literally vibrates during operation. Notwithstanding this vibration, there is provided an advantageous motor mounting which resists wear on the drive interconnection which would otherwise be present due to normal loadings on the auger shaft extension 19. Advantageous for use as the motor 23 is the high torque low-speed hydraulic type motor seen in U.S. Patent No. 2,821,171, which employs inner and outer toothed members wherein the inner member develops a hypocycloidal movement.

In general, the looseness of the couplings previously mentioned are advantageously of the range of 1/64–1/8", depending upon the physical dimensions of the various parts.

While in the foregoing specification a detailed description of an embodiment of the invention has been set down for the purpose of illustration, many variations in the details herein given may be made by those skilled in the art without departing from the spirit and scope of the invention.

I claim:

1. A motor mounting of the character described, comprising a mounting bracket having means at one end for coupling to a housing supporting a driven member, the other end of said bracket being equipped with an integral mounting ring, a hydraulic motor loosely coupled to said ring in cantilever fashion relative to said bracket, said motor having an output shaft projecting into said bracket for loose coupling with a driven member supported in said housing, and pin means extending through said ring for achieving a loose coupling between said ring and said motor whereby said motor is adapted to shift position during operation to compensate for deflection in said driven member.

2. The structure of claim 1 in which said motor is provided with a pilot boss loosely received within said ring.

3. The structure of claim 1 in which the looseness of said coupling is of the order of 1/64–1/8" clearance.

4. A motor mount, comprising a frame, a driven member subject to deflection mounted on said frame and equipped with a shaft extending beyond said frame, a motor mounting bracket secured to said frame about said extending shaft, and a hydraulic motor having a slow speed, high torque output shaft axially aligned with said extending shaft, said motor being loosely coupled only at one end thereof to said bracket and said output shaft being loosely coupled only at one end thereof to said extending shaft, whereby said motor is adapted to shift its position relative to said bracket and driven member to compensate for driven member deflection, said bracket including spaced-apart walls, one of said walls being secured to said frame and the other wall being in confronting relation to said motor, a pair of openings in said bracket other wall, a pair of openings in said motor aligned with said bracket openings, a pair of shear pins extending parallel to said motor shaft slidingly received in the aligned openings to permit radial movement of said pins, said extending shaft being equipped with an axial bore receiving said motor shaft whereby said motor is cantilever-mounted, and cotter pin means in said pins restricting disengagement thereof from said bracket other wall but permitting axial movement thereof.

5. A motor mount, comprising a frame, a driven member subjected to deflection mounted on said frame and equipped with a shaft extending beyond said frame, the motor mounting bracket secured to said frame about said extending shaft, said bracket having a pair of openings provided therein, a hydraulic motor axially aligned with said extending shaft, said motor having a pair of openings aligned with said bracket openings, a pair of shear pins extending parallel to said motor shaft slidingly received in the aligned openings to permit radial movement of said pins, and cotter pin means in said pins restricting disengagement thereof from said bracket but permitting axial movement thereof, said output shaft being loosely coupled at one end thereof to said extending shaft, whereby said motor is adapted to shift its position relative to said bracket and driven member to compensate for driven member deflection.

References Cited by the Examiner

UNITED STATES PATENTS

| | | | |
|---|---|---|---|
| 1,259,132 | 3/1918 | Ritz | 64—4 X |
| 2,188,807 | 1/1940 | Castricone | 248—18 |
| 2,421,529 | 6/1947 | Tyler | 248—26 |
| 2,664,002 | 6/1953 | Anderson | 64—6 |
| 2,934,296 | 4/1960 | Gaubatz | 248—15 |
| 3,023,854 | 4/1962 | Lohr | 64—15 X |

FRED C. MATTERN, Jr., *Primary Examiner.*

HALL C. COE, *Examiner.*